March 29, 1927.
F. H. PENNEY
1,622,539
PROTECTIVE SYSTEM
Filed March 2, 1925
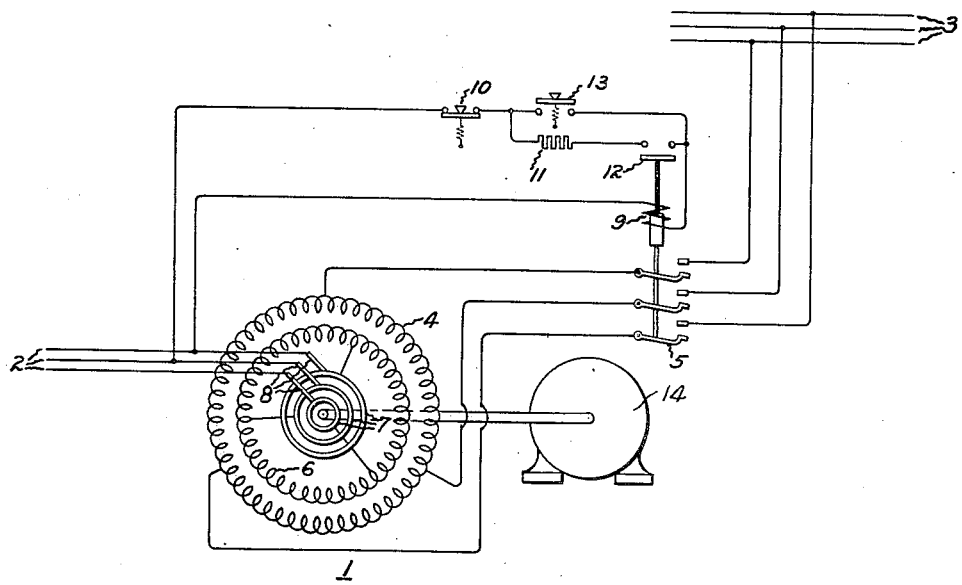
Inventor:
Frank H. Penney,
by *Alexander S. [signature]*
His Attorney.

Patented Mar. 29, 1927.

1,622,539

UNITED STATES PATENT OFFICE.

FRANK H. PENNEY, OF SCOTIA, NEW YORK, ASSIGNOR TO GENERAL ELECTRIC COMPANY, A CORPORATION OF NEW YORK.

PROTECTIVE SYSTEM.

Application filed March 2, 1925. Serial No. 12,616.

My invention relates to the protection of electric machines comprising a winding through which current is likely to be transmitted at a voltage and frequency changing in the same proportion, and has for its object the provision of an improved protective system which is operable in response to current of a predetermined voltage and frequency.

In the operation of electric machines, it frequently happens that current of a voltage and frequency changing in the same ratio is produced; that it is desirable to utilize this current for controlling the energization of the operating coil of a relay or other protective device; and that difficulty is encountered in utilizing current of this character to control the energization of a coil having inductance for the reason that the effect of change in voltage is neutralized by the effect of change in frequency. In accordance with my invention this difficulty is avoided by the provision of means for differentiating between the effects of voltage and frequency in a manner to produce operation of the protective device when a predetermined voltage and frequency of the energizing current have been established.

My invention will be better understood from the following description when considered in connection with the accompanying drawing and its scope will be pointed out in the appended claims.

Referring to the drawing, there is shown in the single figure thereof a frequency changer arranged to be protected in accordance with my invention.

The figure shows a frequency changer 1 which is arranged to interchange currents of different frequencies between polyphase lines 2 and 3. The frequency changer 1 comprises a stator winding 4 which is connected to the line 3 through a switch 5, and a rotor winding 6 which is connected to the line 2 through slip rings 7 and brushes 8. It will readily be understood that any suitable means 14 may be provided for driving the rotor of the machine 1 at a speed dependent on the difference between the frequencies of lines 2 and 3. Operation of the switch 5 is controlled through a coil 9 which is connected to one phase of the line 2 through a stop switch 10, a resistor 11 and an interlock switch 12 when the switch 5 is in its closed position. A starting switch 13 is provided for short circuiting the resistor 11 during starting of the machine.

Assuming that the winding 4 has twice as many turns as the winding 6, that current is supplied from the line 3 to the winding 4 at 60 cycles and 220 volts, and that the rotor of the machine 1 is stationary, it will be readily understood that the machine 1 functions as a transformer through which current is supplied to the line 2 at 60 cycles and 110 volts. As the rotor of the machine 1 is accelerated, the voltage and frequency of the current supplied to the line 2 will increase in the same proportion and a highly inductive device, such as the relay operating coil 9 for example, will take an approximately constant current from the line 2 because the effect of voltage rise is offset by the increase in frequency. In order to prevent overheating of the machine 1, however, it is desirable that the switch 5 be operated to disconnect this machine from the line 3 when the voltage and frequency of line 2 are below a predetermined value. As hereinafter explained, this result is produced by means of the resistor 11 which is arranged to be short-circuited by the switch 13 during starting of the machine 1, is connected in series with the coil 9 during normal operation of the machine, and is designed to have a resistance so related to the impedance of the coil 9 as to permit opening of the switch 5 when the voltage and frequency of the line 2 have decreased to a predetermined value.

Assuming the stop switch 10 to be in its closed position as illustrated and the switch 5 and interlock switch 12 to have been closed in any suitable manner the switches 5 and 12 may be maintained in their closed positions during acceleration of the machine 1 by short-circuiting the resistor 11 through switch 13. Under these conditions, the voltage and frequency of the current supplied from the line 2 to the coil 9 increase in the same proportion and the current is maintained at a value high enough to prevent opening of the switch 5. When the machine has attained its normal speed, the starting switch 13 may be released, thereby connecting the resistor 11 directly in series with the coil 9. With these connections, the switch 5 will be maintained in its closed position so long as the voltage and frequency of the line 2 exceed a value predetermined by the relation between the resistance of the resistor 11 and the impedance of the coil 9, but will be permitted to open when the voltage and frequency have decreased to a value at which overheating of the machine is likely to be produced.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

1. The combination of an electric machine comprising a winding through which current is transmitted at a voltage and frequency which change in the same proportion, means comprising an operating coil for controlling the energization of said machine, and a resistor arranged to be connected to said winding in series with said coil whereby operation of said control means is produced when the voltage and frequency of said current are below a value predetermined by the relation existing between the resistance of said resistor and the impedance of said coil.

2. The combination of current supply means, an electric machine comprising a winding through which current is transmitted at a voltage and frequency which change in the same proportion, means comprising an operating coil for controlling the interconnection of said machine with said supply means, and means connected to said winding in series with said coil for predetermining the voltage and frequency at which operation of said control means is produced.

3. The combination of current supply means, an electric machine comprising a winding through which current is transmitted at a voltage and frequency which change in the same proportion, means comprising an operating coil for controlling the interconnection of said machine with said supply means, a resistor connected to said winding in series with said coil for predetermining the voltage and frequency at which operation of said control means is produced, and means for connecting said coil to said winding independently of said resistor during acceleration of said machine.

4. The combination of current supply means, an electric machine comprising a winding through which current is transmitted at a voltage and frequency which change in the same proportion, means comprising an operating coil for controlling the interconnection of said machine with said supply means, means connected to said winding and said coil for predetermining the voltage and frequency at which operation of said control means is produced, and means for interrupting the circuit between said winding and said coil when said control means is operated to disconnect said machine from said current supply means.

5. The combination of a frequency changer, comprising relatively movable windings, means for controlling the energization of one of said windings, and means connected to the other of said windings for producing operation of said control means when the voltage and frequency of the current supplied thereto have attained a predetermined value.

In witness whereof, I have hereunto set my hand this 28th day of February, 1925.

FRANK H. PENNEY.